United States Patent
Ogawa et al.

(10) Patent No.: US 6,698,686 B2
(45) Date of Patent: Mar. 2, 2004

(54) AIRSHIP

(75) Inventors: Daihachi Ogawa, Kakamigahara (JP); Masanobu Ogaki, Kakamigahara (JP); Yoshitaka Sasaki, Kakamigahara (JP); Masahiko Sugawara, Kakamigahara (JP); Takayoshi Maehata, Inuyama (JP); Katsuji Fukumoto, Kakamigahara (JP)

(73) Assignee: Kawasaki Jukogyo Kabushiki Kaisha, Kobe (JP)

(*) Notice: Subject to any disclaimer, the term of this patent is extended or adjusted under 35 U.S.C. 154(b) by 0 days.

(21) Appl. No.: 10/257,070

(22) PCT Filed: Mar. 13, 2002

(86) PCT No.: PCT/JP02/02376
§ 371 (c)(1),
(2), (4) Date: Oct. 9, 2002

(87) PCT Pub. No.: WO02/092427
PCT Pub. Date: Nov. 21, 2002

(65) Prior Publication Data
US 2003/0146345 A1 Aug. 7, 2003

(30) Foreign Application Priority Data
May 11, 2001 (JP) ......................................... 2001-140860

(51) Int. Cl.[7] ................................................. B64B 1/02
(52) U.S. Cl. .............................. 244/30; 244/31; 244/96; 244/97
(58) Field of Search .............................. 244/24, 29, 30, 244/31, 5, 96, 97

(56) References Cited

U.S. PATENT DOCUMENTS

| 3,620,485 A | * | 11/1971 | Egon ............................ 244/29 |
| 3,972,492 A | * | 8/1976 | Milne .......................... 244/30 |
| 4,773,617 A | * | 9/1988 | McCampbell ................ 244/24 |
| 5,890,676 A | * | 4/1999 | Coleman et al. ............ 244/128 |
| 6,427,943 B2 | * | 8/2002 | Yokomaku et al. .......... 244/30 |

FOREIGN PATENT DOCUMENTS

| GB | 2 196 919 A | 5/1988 |
| JP | A 2-185894 | 7/1990 |
| JP | A 2001-130493 | 5/2001 |
| JP | A 2001-199397 | 7/2001 |

* cited by examiner

Primary Examiner—J. Woodrow Eldred
(74) Attorney, Agent, or Firm—Oliff & Berridge, PLC

(57) ABSTRACT

A plurality of bulkheads ($23a$ to $23d$) are installed in a hull (21) so as to divide the interior space of the hull (21) into a plurality of compartments ($\Delta S1$ to $\Delta S5$) successively arranged along the axis (22) of the hull (21). The compartments ($\Delta S1$ to $\Delta S5$) are divided into upper flotation gas containing spaces ($25a$ to $25e$) and lower air containing spaces ($26a$ to $26e$) by flexible diaphragms ($24a$ to $24e$) impermeable to air and a flotation gas, respectively. The bulkheads ($23a$ to $23d$) have upper parts A$1a$, A$1b$, A$1c$ and A$1d$ formed of a meshed sheet, extending upward from joints ($27a$ to $27d$) of the diaphragms ($24a$ to $24e$) and the bulkheads ($23a$ to $23d$), exposed to the flotation gas containing spaces ($25a$ to $25e$). The upper parts are provided with a plurality of vents through which the flotation gas is allowed to flow.

10 Claims, 5 Drawing Sheets

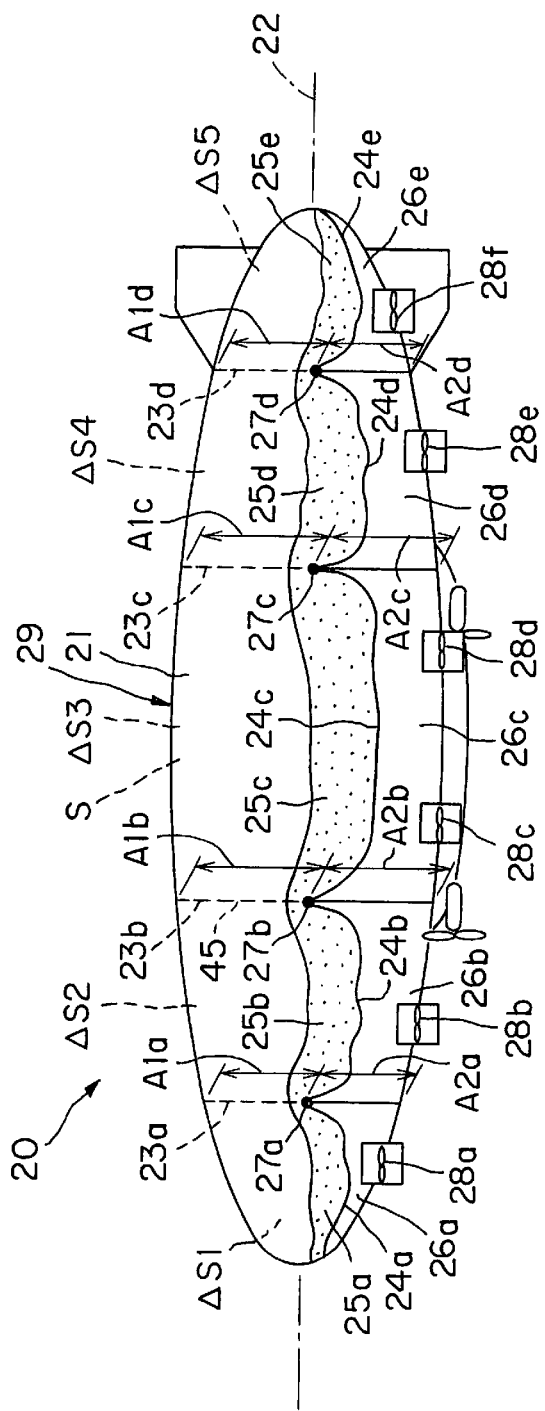
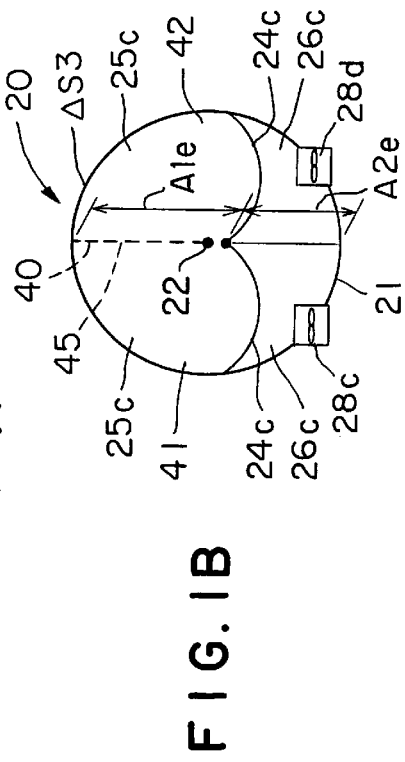
FIG. 1A
FIG. 1B

AIRSHIP

TECHNICAL FIELD

The present invention relates to an airship capable of high-altitude flying and having improved horizontal stability.

BACKGROUND ART

FIGS. 5A and 5B show a conventional airship 1. FIG. 5A shows the airship 1 in a condition of flying or staying at a low altitude, and FIG. 5B shows the airship 1 in a condition of flying or staying at a high altitude. The airship 1 has a hull 2, a nose ballonet 5 placed in the bottom of a part of the hull 2 near a nose 3, and a tail ballonet 6 placed in the bottom of a part of the hull 2 near a tail 4. Most part of a space 9 in the hull 2 excluding spaces occupied by the ballonets 5 and 6 is occupied by flotation ballonets filled up with a flotation gas, such as He gas.

The ballonets 5 and 6 are provided with blowers 7 and 8 for taking air into and discharging air from the ballonets 5 and 6, respectively, to vary the mass balance between the nose 3 and the tail 4 selectively to control the pitch angle, i.e., the inclination in a vertical plane, of the airship 1.

Another prior art disclosed in JP-A No. 185894/1990 relates to an airship including a hull filled up with a flotation gas, and provided with a propulsion unit and an attitude control mechanism. This airship is provided with a flotation ballonet filled up with a flotation gas and placed in the hull, which is substantially statically and dynamically symmetrical with respect to an imaginary horizontal plane including the axis of the hull and an imaginary vertical plane including the axis of the hull, a pair of ballonets, i.e., air bags, placed in an upper and a lower part of the hull, respectively, and a pair of ballonets, i.e., air bags, placed in a front and a rear part of the hull, respectively, to improve the maneuverability, to reduce the operating cost and to enhance the weather resistance of the airship. The propulsion unit supplies necessary air into the plurality of ballonets or discharges air from the plurality of ballonets through selector valves, when a control fin included in a tail fin is unable to control the yaw angle and the roll angle satisfactorily while the airship is flying at a low speed or stopping. The attitude of the airship can be stabilized by thus regulating the quantities of air contained in the ballonets to shift the center of gravity of the hull.

The prior arts illustrated by FIGS. 5A and 5B and mentioned in JP-A No. 185894/1990 achieve the control of the pitch by supplying air into or discharging air from the ballonets placed near the nose and the tail, respectively, of the hull to shift the center of gravity along the longitudinal axis of the hull by changing the longitudinal mass balance of the hull. However, since the volumes of the ballonets relative to that of the hull are small, the center of gravity cannot be quickly changed by operating the ballonets and hence the pitch angle cannot be quickly controlled, so that the response of attitude control is not satisfactory.

Since the ballonets are placed in the bottom of the hull in each of those prior art airships, most part of the flotation gas prevails in an upper region of the hull. Therefore, if an upper part of the hull is heated by solar energy, part of the flotation gas prevailing in the upper region of the hull is heated, parts of the flotation gas in different regions of the hull have different specific weights, respectively, and the flotation gas circulates in the hull. Consequently, the front and the rear ballonet are deformed, the mass balance of the airship which has been in a horizontally stabilized state is lost and the hull pitches.

The pitching of the hull caused by a disturbance, such as heating of flotation gas by solar energy, induces the flow of the flotation gas and air in the hull, causing undesirably long displacement of the center of gravity. The displacement of the center of gravity causes change in the attitude of the airship which has been in a horizontally stabilized state. Thus, the prior art airships have poor attitude stability.

DISCLOSURE OF THE INVENTION

It is an object of the present invention to provide an airship having an improved response characteristic for attitude control, and improved attitude stability.

According to the present invention, an airship includes a hull having an axis, bulkheads installed in the hull and dividing the interior space of the hull into a plurality of compartments, a flexible diaphragm provided in each compartment for dividing the compartment into an upper flotation gas containing space and a lower air containing space, and an air supply-and-discharge device placed in the air containing space of each compartment.

In the airship according to the present invention, each bulkhead has an upper part facing the flotation gas containing space of the compartment, and a lower part facing the air containing space of the compartment, and the upper part of each bulkhead is provided with vents through which a flotation gas flows.

In the airship according to the present invention, the lower part of each bulkhead is formed of an airtight sheet.

In the airship according to the present invention, the upper part of each bulkhead is formed of a meshed sheet provided with a plurality of vents.

In the airship according to the present invention, the lower part of each bulkhead is formed of an airtight polymer film.

In the airship according to the present invention, the hull is provided with a plurality of bulkheads dividing the interior space of the hull into compartments, and the number of the compartments is determined such that restoring moment to restore the hull to a horizontal attitude increases with the increase of the hull inclination equal to the angle of the axis of the hull to a horizontal plane and decreases substantially to zero when the hull inclination decreases substantially to zero.

In the airship according to the present invention, the bulkheads installed in the hull divides the interior space of the hull into five compartments.

In the airship according to the present invention, additional bulkheads substantially parallel to the axis are disposed in the compartments, and each additional bulkhead divides the corresponding compartment into a plurality of additional compartments.

In the airship according to the present invention, each of the additional bulkheads has an upper part facing the flotation gas containing space and a lower part facing the air containing space, and the upper part is provided with vents through which the flotation gas flows.

In the airship according to the present invention, the lower part of the additional bulkhead is formed of an airtight sheet.

In the airship according to the present invention, the air supply-and-discharge devices are disposed in the air containing spaces of the additional compartments, respectively.

According to the present invention, the space in the hull is divided axially into the plurality of compartments by the plurality of bulkheads, each compartment is divided into an upper flotation gas containing space and a lower air containing space by the diaphragm, and each bulkhead is provided with the vents that allow the flotation gas to flow between the adjacent upper flotation gas containing spaces. The hull is provided with the air supply-and-discharge devices for supplying external air into the air containing spaces and discharging air from the air containing spaces.

Since the interior space of the hull is divided axially into the plurality of compartments, and each compartment is divided into the lower air containing space and the upper flotation gas containing space, the flotation gas is able to flow freely through the vents between the flotation gas containing spaces in the adjacent compartments even if the airship is operated at a high altitude, such as a stratospheric altitude, is held at a fixed position in an environment where the airship is exposed directly to solar radiation and an upper part of the hull and the flotation gas therein are heated by solar energy. The mass balance can be sharply changed to control the attitude of the airship by controlling the quantities of air contained in the air containing spaces in the axially separated compartments.

According to the present invention, when the interior space of the hull is divided into the plurality of compartments, the number of the compartments is determined such that restoring moment to restore the hull to a horizontal attitude increases with the increase of the hull inclination and decreases substantially to zero when the hull inclination decreases substantially to zero. Therefore, the hull can be surely and quickly restored to a horizontal or substantially horizontal attitude even if the hull is inclined at a large inclination.

BRIEF DESCRIPTION OF THE DRAWINGS

FIG. 1A is a schematic sectional view of an airship in a first embodiment according to the present invention;

FIG. 1B is a view of an airship in a second embodiment according to the present invention;

BEST MODE FOR CARRYING OUT THE INVENTION

Figure 2:
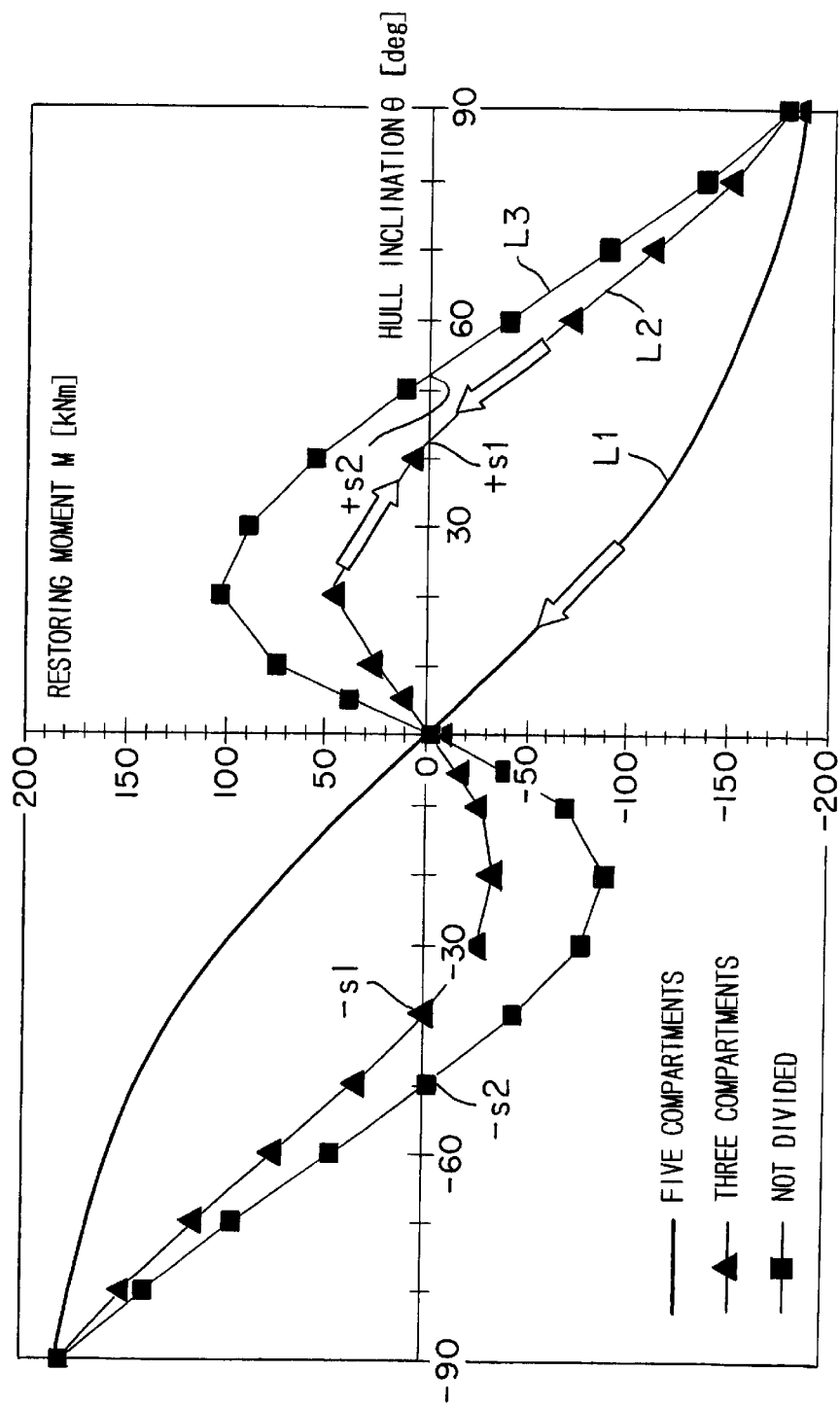
FIG. 2 is a graph showing the relation between hull inclination θ and restoring moment M for an airship having a hull of a predetermined scale.

FIG. 1A is a schematic sectional view of an airship 20 in a first embodiment according to the present invention. The airship 20 in the first embodiment has a hull 21 having an axis 22, and a plurality of bulkheads 23a, 23b, 23c and 23d dividing the interior space S of the hull 21 into a plurality of compartments ΔS1, ΔS2, ΔS3, ΔS4 and ΔS5 arranged along the axis 22. The compartments ΔS1 to ΔS5 are divided into upper flotation gas containing space 25a, 25b, 25c, 25d and 25e for containing a flotation gas and lower air containing spaces 26a, 26b, 26c, 26d and 26e for containing air by flexible diaphragms 24a, 24b, 24c, 24d and 24e impermeable to air and the flotation gas, respectively. The flotation gas is, for example, He gas.

The bulkheads 23a to 23d have upper parts A1a, A1b, A1c and A1d formed of a meshed sheet, extending upward from joints 27a, 27b, 27c and 27d of the diaphragms 24a to 24e, exposed to the flotation gas containing spaces 25a to 25e, and provided with a plurality of vents 45, respectively, and lower parts A2a, A2b, A2c and A2d formed of an airtight sheet, such as a polymer film impermeable to the flotation gas and air, extending downward from the joints 27a, 27b, 27c and 27d of the diaphragms 24a to 24e, and exposed to the air containing spaces 26a to 26e, respectively.

Blowers 28a, 28b, 28c and 28d, 28e, and 28f, i.e., air supply-and-discharge devices, for supplying external air into the air containing spaces 26a to 26e of the hull 21, and discharging from the air containing spaces 26a to 26e are placed in the air containing spaces 26a to 26e of the hull 21, respectively.

Thus, the interior space S of the hull 21 is divided into the plurality of compartments ΔS1, ΔS2, ΔS3, ΔS4 and ΔS5 arranged along the axis 22, and the compartments ΔS1 to ΔS5 are divided into the upper flotation gas containing space 25a to 25e for containing the flotation gas, which are communicating with each other, and the lower air containing spaces 26a to 26e for containing air, which are isolated from each other. Therefore, even if an upper part 29 of the hull 21 is heated by solar energy and part of the flotation gas contained in the hull 21 is heated, the flotation gas is able to flow freely through the vents formed in the bulkheads 23a to 23d between the flotation gas containing spaces 25a to 25e of the compartments ΔS1 to ΔS5. The attitude of the airship 20 can be controlled at a high response speed by controlling the quantities of air contained in the isolated air containing spaces 26a to 26e of the compartments ΔS1 to ΔS5 arranged along the axis 22 so as to change the mass balance sharply.

Figure 3:
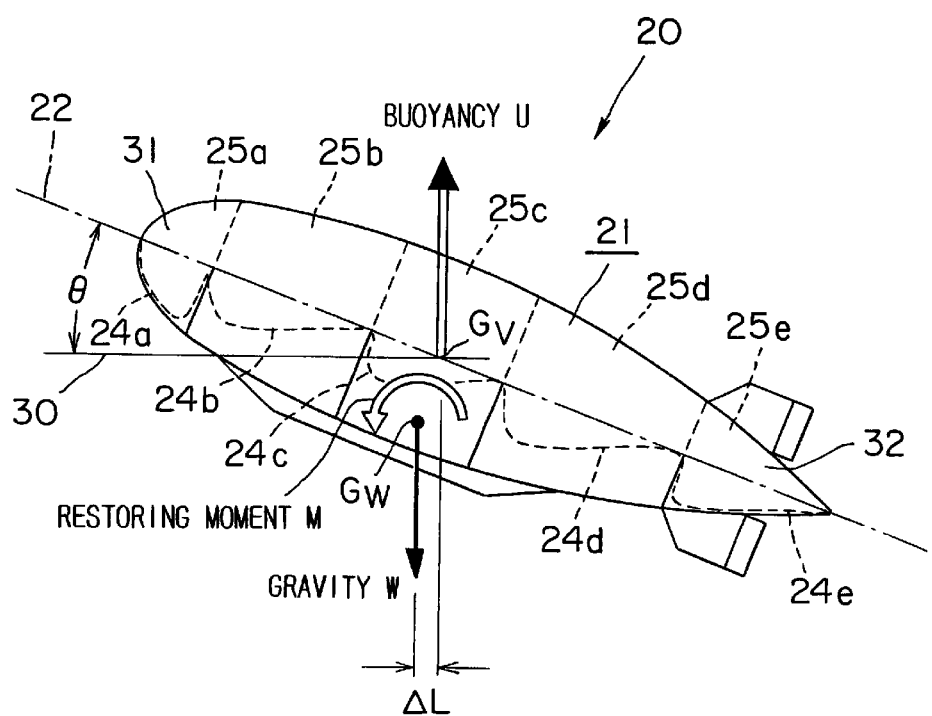
FIG. 3 is a view of assistance in explaining the relation between the buoyancy U and the gravity W of an inclined airship.

FIG. 2 is a graph showing the calculated relation between hull inclination θ and restoring moment M for an airship 20 having a hull of a predetermined scale, and FIG. 3 is a view of assistance in explaining the relation between the buoyancy U and the gravity W of the inclined airship 20. In FIG. 2, restoring moment M (kNm) about the center G of gravity of the airship 20 is measured on the vertical axis, and hull inclination θ (deg.) is measured on the horizontal axis.

The inventors of the present invention calculated the change of restoring moment M with hull inclination θ when the interior space S of the hull 21 of the airship 20 are divided into a plurality of compartments to determine an optimum number of the compartments arranged along the axis 22 of the hull 21. The ratio $V_{He}:V_{Ai}$ was supposed to be 66:34, where $V_{He}$ is the volume of He gas and $V_{Air}$ is the volume of air in the airship 20 as moored to a mooring mast on the ground.

In FIG. 2, a curve L1 shows the variation of restoring moment M with hull inclination θ when the interior space of the hull is divided into five compartments, a curve L2 shows the variation of restoring moment M with hull inclination θ when the interior space of the hull is divided into three compartments, and a curve L3 shows the variation of restoring moment M with hull inclination θ when the interior space of the hull is not divided.

FIG. 3 shows typically a hull 21 divided into five divisions found by the inventors of the present invention to be the least number of divisions among predetermined numbers of divisions. When dividing the interior space S of the hull 21 along the axis 22, studies were made to find a number of divisions in which the greatest restoring moment M for hull inclination θ is generated. For example, the curve L1 indicates that restoring moment M that restores the hull 21 to a horizontal attitude increases as hull inclination θ in an imaginary vertical plane including the axis 22 and parallel to the sheet in FIG. 3, to a horizontal plane including the axis 22 and perpendicular to the sheet in FIG. 3, and restoring moment M is substantially zero when the hull inclination θ is substantially zero.

A buoyancy U acts on the voluminal center Gv of the space S of the hull 21, and a gravity W acts on the center Gw of gravity. A restoring moment M acts in a direction to restore the airship 20 to a horizontal attitude when there is a horizontal distance ΔL between the voluminal center Gv and the center Gw of gravity. When the hull inclination θ=0°, i.e., when the hull 21 is horizontal, the voluminal center Gv is on a vertical line passing the center Gw of gravity, and hence restoring moment M=0.

The curve L1 for a condition where the number of division of the interior space S is five indicates that restoring moment M is substantially 0 (kNm) when hull inclination θ is substantially 0 (deg.), and restoring moment M increases as hull inclination θ increases. In FIG. 2, positive values of hull inclination θ are measured in the counterclockwise direction. Thus, the hull 21 can be surely and quickly restored to a horizontal or substantially horizontal attitude regardless of the magnitude of hull inclination θ.

As obvious from the curve L2 for a condition where the number of division of the interior space S is three and the curve L3 for a condition where the interior space S is not divided, restoring moment M=0 (kNm) when hull inclination θ=0 (deg.). However, in the conditions represented by the curves L2 and L3, a reverse moment acts on the airship 20 until positive values of hull inclination θ measured in the positive direction reach beyond stabilizing points +s1 (about +42°) and +s2 (about +52°), and negative values of hull inclination θ measured in the negative direction reach beyond stabilizing points −s1 (about −40°) and −s2 (about −50°), and hence the airship 20 cannot be stabilized in a horizontal attitude. Thus, such numbers of division are not proper.

Figure 4A:
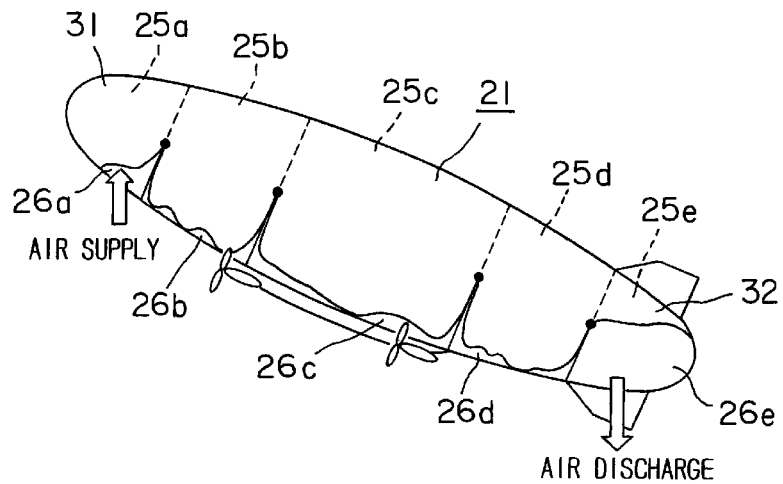
FIG. 4A is a schematic side elevation of an airship inclined with its nose raised and its tail lowered of assistance in explaining an operation for restoring the inclined airship to a horizontal attitude.
Figure 4B:
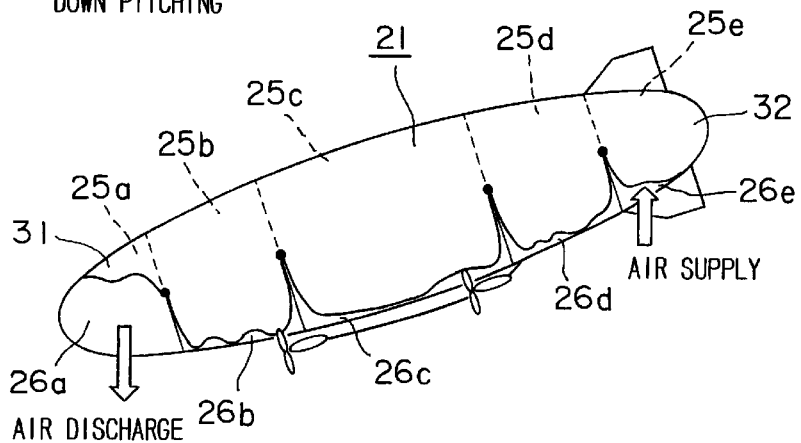
FIG. 4B is a view, similar to FIG. 4A, of the airship inclined with its nose lowered and the tail raised.
Figure 5A:
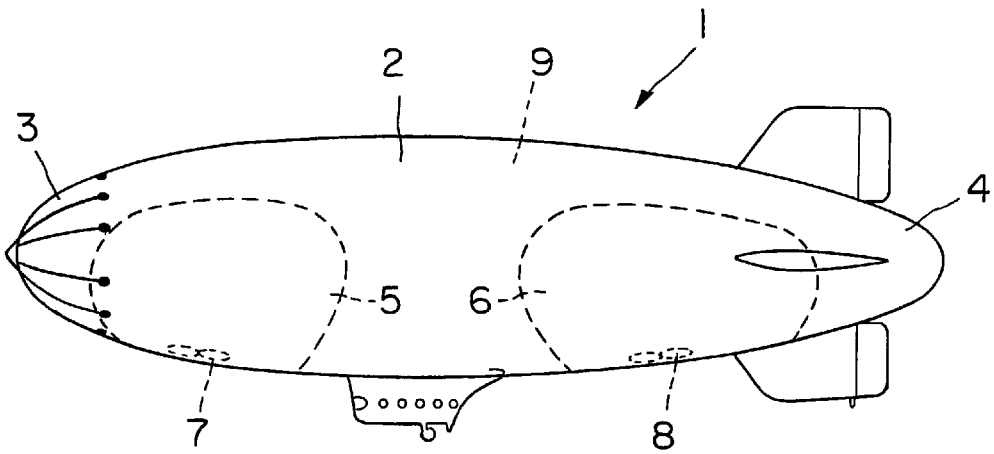
FIG. 5A is a side elevation of a prior art airship in a state where the airship is flying or held stationary at a low altitude.
Figure 5B:
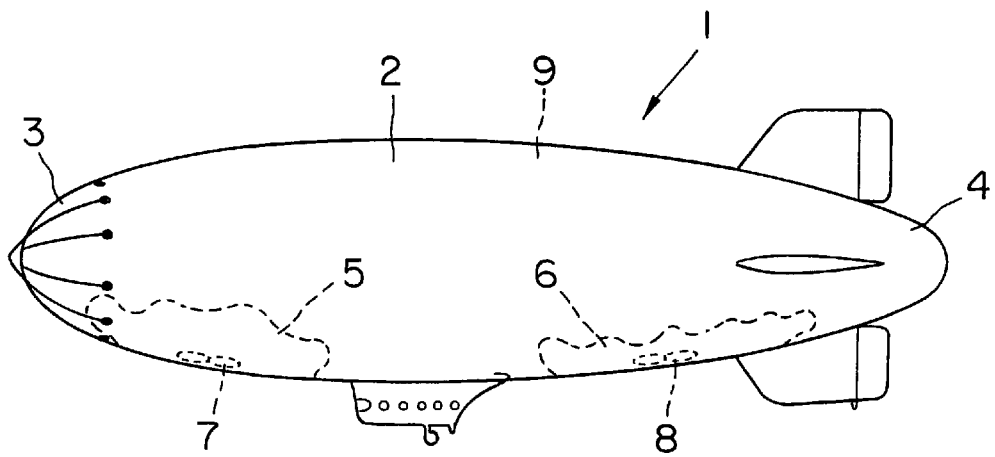
FIG. 5B is a side elevation of the airship shown in FIG. 5A in a state where the airship is flying or held stationary at a high altitude.

FIGS. 4A and 4B are views of assistance in explaining an operation for restoring the inclined airship 20 to a horizontal attitude. The airship 20 is inclined with its nose 31 raised and its tail 32 lowered in FIG. 4A, and the airship 20 inclined with its nose 31 lowered and the tail 32 raised in FIG. 4B. When restoring the airship 20 inclined with the nose 31 raised and the tail 32 lowered as shown in FIG. 4A to a horizontal attitude, the foremost blower 28a close to the nose 31 supplies air into the air containing space 26a. At the same time, the rearmost blower 28f the nearest to the tail 32 discharges air from the air containing space 26e close to the tail 32 to produce a restoring moment M that turns the airship 30 so that the nose 31 is lowered and the tail 32 is raised to restore the airship 20 quickly to a horizontal attitude.

When restoring the airship 20 inclined with the nose 31 lowered and the tail 32 raised as shown in FIG. 4B to a horizontal attitude, the foremost blower 28a close to the nose 31 discharges air from the air containing space 26a. At the same time, the rearmost blower 28f close to the tail 32 supplies air into the air containing space 26e close to the tail 32 to produce a restoring moment M that turns the airship 30 so that the nose 31 is raised and the tail 32 is lowered to restore the airship 20 quickly to a horizontal attitude.

In the airship 20 in the first embodiment, the interior space S of the hull 21 is divided into the plurality of compartments ΔS1 to ΔS5 arranged along the axis 22 by the plurality of bulkheads 23a to 23d, and the compartments ΔS1 to ΔS5 are divided into the upper flotation gas containing space 25a to 25e for containing the flotation gas, and the lower air containing spaces 26a to 26e for containing air by the flexible diaphragms 24a to 24e. The present invention is not limited to the foregoing airship 20.

In an airship 20 in a second embodiment according to the present invention shown in FIG. 1B, at least one of the plurality of compartments ΔS1 to ΔS5, for example, the compartment ΔS3 in a substantially axially middle part of the airship 20 and including the voluminal center Gv and the center Gw of gravity, may be divided by an additional bulkhead 40 having, similarly to the bulkheads 23a to 23d, an upper part A1e facing the flotation gas containing space 25c and provided with vents 45, and a lower part A2e facing the air containing space 26c and formed of an airtight sheet into a plurality of spaces, for example, two spaces, on the laterally opposite sides of an imaginary vertical plane including the axis 22. The additional bulkhead 40 is parallel to the axis 22, and each of right and left additional spaces 41 and 42 demarcated by the additional bulkhead 40 is divided into an upper flotation gas containing space 25c and a lower air containing space 26c by a bulkhead 24c.

This construction of the airship can correct not only the pitch attitude of the airship but also the roll attitude of the airship, i.e., clockwise or counterclockwise turning of the airship about the axis 22 by a large restoring moment and, consequently, the attitude stability of the airship can be further improved.

According to the present invention, since the interior space of the hull is divided axially into the plurality of compartments, and each compartment is divided into the lower air containing space and the upper flotation gas containing space, the flotation gas is able to flow freely through the vents between the flotation gas containing spaces in the adjacent compartments even if an upper part of the hull and the flotation gas therein are heated by solar energy.

Consequently, the air ship can be kept in a horizontal attitude and the attitude stability of the airship can be improved. Since the quantities of air in the air containing spaces arranged along the axis and isolated from each other can be individually controlled, the mass balance of the hull can be changed greatly in a short time to shift the center of gravity, the pitch attitude can be quickly changed to restore the airship to the horizontal attitude, and the response characteristic of attitude control can be improved.

According to the present invention, when dividing the interior space of the hull into the compartments, the number of the compartments is determined such that restoring moment to restore the hull to a horizontal attitude increases with the increase of the hull inclination and decreases substantially to zero when the hull inclination decreases substantially to zero. Thus, the hull can be surely and quickly restored to a horizontal or substantially horizontal attitude even if the hull is inclined at a large inclination.

What is claimed is:

1. An airship comprising:
   a hull having an axis;
   bulkheads installed in the hull and dividing the interior space of the hull into a plurality of compartments;
   a flexible diaphragm provided in each compartment, for dividing the compartment into an upper flotation gas containing space and a lower air containing space;

an air supply-and-discharge device placed in the air containing space of each compartment, wherein:

each bulkhead has an upper part facing the flotation gas containing space of the compartment, and a lower part facing the air containing space of the compartment, and the upper part of each bulkhead is provided with vents through which a flotation gas flows, and the lower part of each bulkhead is formed of an airtight sheet.

2. The airship according to claim 1, wherein
the upper part of each bulkhead is formed of a meshed sheet provided with a plurality of vents.

3. The airship according to claim 1, wherein
the lower part of each bulkhead is formed of an airtight polymer film.

4. The airship according to claim 1, wherein
the hull is provided with a plurality of bulkheads dividing the interior space of the hull into compartments, and the number of the compartments is determined such that restoring moment to restore the hull to a horizontal attitude increases with the increase of the hull inclination equal to the angle of the axis of the hull to a horizontal plane, and decreases substantially to zero when the hull inclination decreases substantially to zero.

5. The airship according to claim 4, wherein
the bulkheads installed in the hull divides the interior space of the hull into five compartments.

6. The airship according to claim 1 further comprising:
additional bulkheads substantially parallel to the axis and each disposed in each compartment to divide the compartment into a plurality of additional compartments.

7. The airship according to claim 6, wherein
each of the additional bulkheads has an upper part facing the flotation gas containing space, and a lower part facing the air containing space, and the upper part is provided with vents through which the flotation gas flows.

8. The airship according to claim 6, wherein
the lower part of the additional bulkhead is formed of an airtight sheet.

9. The airship according to claim 6, wherein
air supply-and-discharge devices are disposed in the air containing spaces of the additional compartments, respectively.

10. The airship according to claim 1, wherein the upper part of each bulkhead is provided with vents so that the flotation gas flows from one compartment to another compartment.

* * * * *